(12) United States Patent
Hoshino

(10) Patent No.: US 11,305,591 B2
(45) Date of Patent: Apr. 19, 2022

(54) PNEUMATIC TIRE

(71) Applicant: BRIDGESTONE CORPORATION, Tokyo (JP)

(72) Inventor: Yuta Hoshino, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 46 days.

(21) Appl. No.: 16/890,243

(22) Filed: Jun. 2, 2020

(65) Prior Publication Data
US 2020/0290407 A1   Sep. 17, 2020

Related U.S. Application Data

(63) Continuation of application No. PCT/JP2018/044794, filed on Dec. 5, 2018.

(30) Foreign Application Priority Data

Dec. 7, 2017  (JP) .............................. JP2017-235456

(51) Int. Cl.
   *B60C 19/12*   (2006.01)
   *B60C 13/00*   (2006.01)
   *B60C 1/00*    (2006.01)

(52) U.S. Cl.
   CPC .......... *B60C 13/002* (2013.01); *B60C 1/0008* (2013.01); *B60C 19/122* (2013.01)

(58) Field of Classification Search
   CPC ..... B60C 19/12; B60C 19/122; B60C 19/125; B60C 19/127
   See application file for complete search history.

(56) References Cited

U.S. PATENT DOCUMENTS

| | | | | |
|---|---|---|---|---|
| 1,566,266 | A * | 12/1925 | Barrell | B60C 19/122 152/199 |
| 2002/0074068 | A1* | 6/2002 | Howland | B60C 19/12 152/310 |
| 2004/0069387 | A1 | 4/2004 | Fukutomi et al. | |
| 2014/0246133 | A1* | 9/2014 | Lamontia | B60C 19/002 152/151 |

FOREIGN PATENT DOCUMENTS

| | | |
|---|---|---|
| CN | 2597223 Y | 1/2004 |
| FR | 2 879 504 A1 | 6/2006 |
| FR | 2 886 581 A1 | 12/2006 |

(Continued)

OTHER PUBLICATIONS

International Search Report of PCT/JP2018/044794 dated Mar. 12, 2019.

(Continued)

*Primary Examiner* — Justin R Fischer
(74) *Attorney, Agent, or Firm* — Sughrue Mion, PLLC

(57) ABSTRACT

A pneumatic tire comprises a puncture prevention member adhered to at least a part of an inner surface of a tire body, wherein the puncture prevention member includes one or more protective layers each of which includes: an internal pressure retention layer; and a protective material located on a tire outer surface side of the internal pressure retention layer in at least a part of an extending region of the internal pressure retention layer.

2 Claims, 11 Drawing Sheets

(56) References Cited

FOREIGN PATENT DOCUMENTS

| | | |
|---|---|---|
| JP | 11-001794 Y1 | 2/1936 |
| JP | 50-136103 U | 11/1975 |
| JP | 04-212607 A | 8/1992 |
| JP | 10-016523 A | 1/1998 |
| JP | 2002-283817 A | 10/2002 |
| JP | 2004-017668 A | 1/2004 |
| JP | 2004-345469 A | 12/2004 |

OTHER PUBLICATIONS

International Preliminary Report on Patentability dated Jun. 9, 2020 from the International Bureau in International Application No. PCT/JP2018/044794.

* cited by examiner

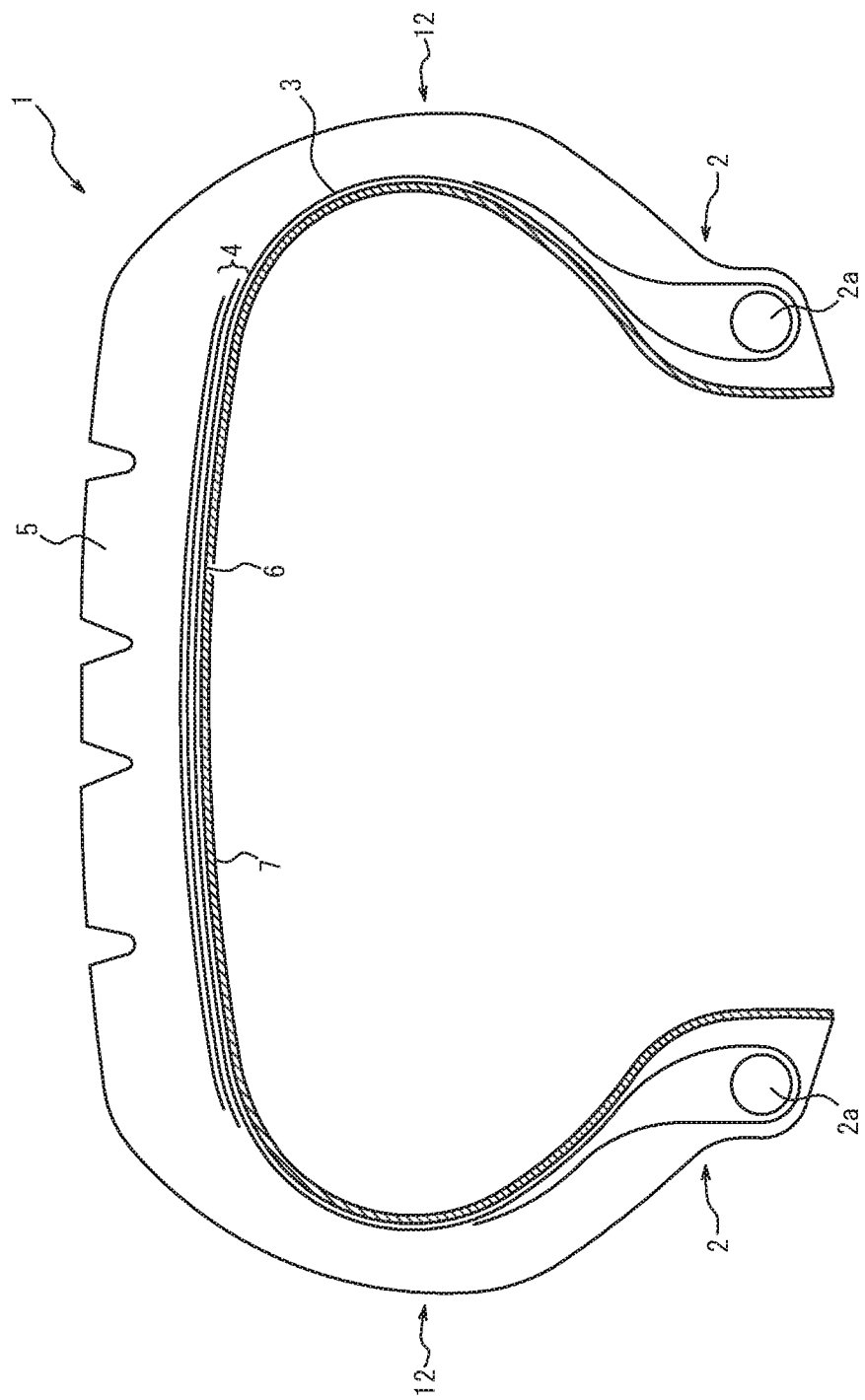

PNEUMATIC TIRE

TECHNICAL FIELD

The present disclosure relates to a pneumatic tire.

BACKGROUND

Various measures are conventionally taken against punctures of pneumatic tires.

For example, a side portion-reinforcing run flat tire in which a side rubber having a crescent-shaped cross section is provided at a side portion is known (for example, PTL 1). Such a tire can keep running even when punctured, by the side rubber bearing the load instead.

CITATION LIST

Patent Literature

PTL 1: JP 2004-17668 A

SUMMARY

Technical Problem

However, the provision of the side rubber causes a decrease in ride comfort and an increase in weight of the run flat tire. It is therefore desirable to improve the puncture resistance itself to prevent tire punctures.

It could be helpful to provide a pneumatic tire having improved puncture resistance.

Solution to Problem

We provide the following:

A pneumatic tire according to the present disclosure comprises a puncture prevention member adhered to at least a part of an inner surface of a tire body, wherein the puncture prevention member includes one or more protective layers each of which includes: an internal pressure retention layer; and a protective material located on a tire outer surface side of the internal pressure retention layer in at least a part of an extending region of the internal pressure retention layer.

Advantageous Effect

It is therefore possible to provide a pneumatic tire having improved puncture resistance.

BRIEF DESCRIPTION OF THE DRAWINGS

In the accompanying drawings:

FIG. 9 is a tire widthwise cross-sectional view of a pneumatic tire according to another one of the disclosed embodiments.

DETAILED DESCRIPTION

Some of the disclosed embodiments will be described in detail below, with reference to the drawings.

Figure 1:
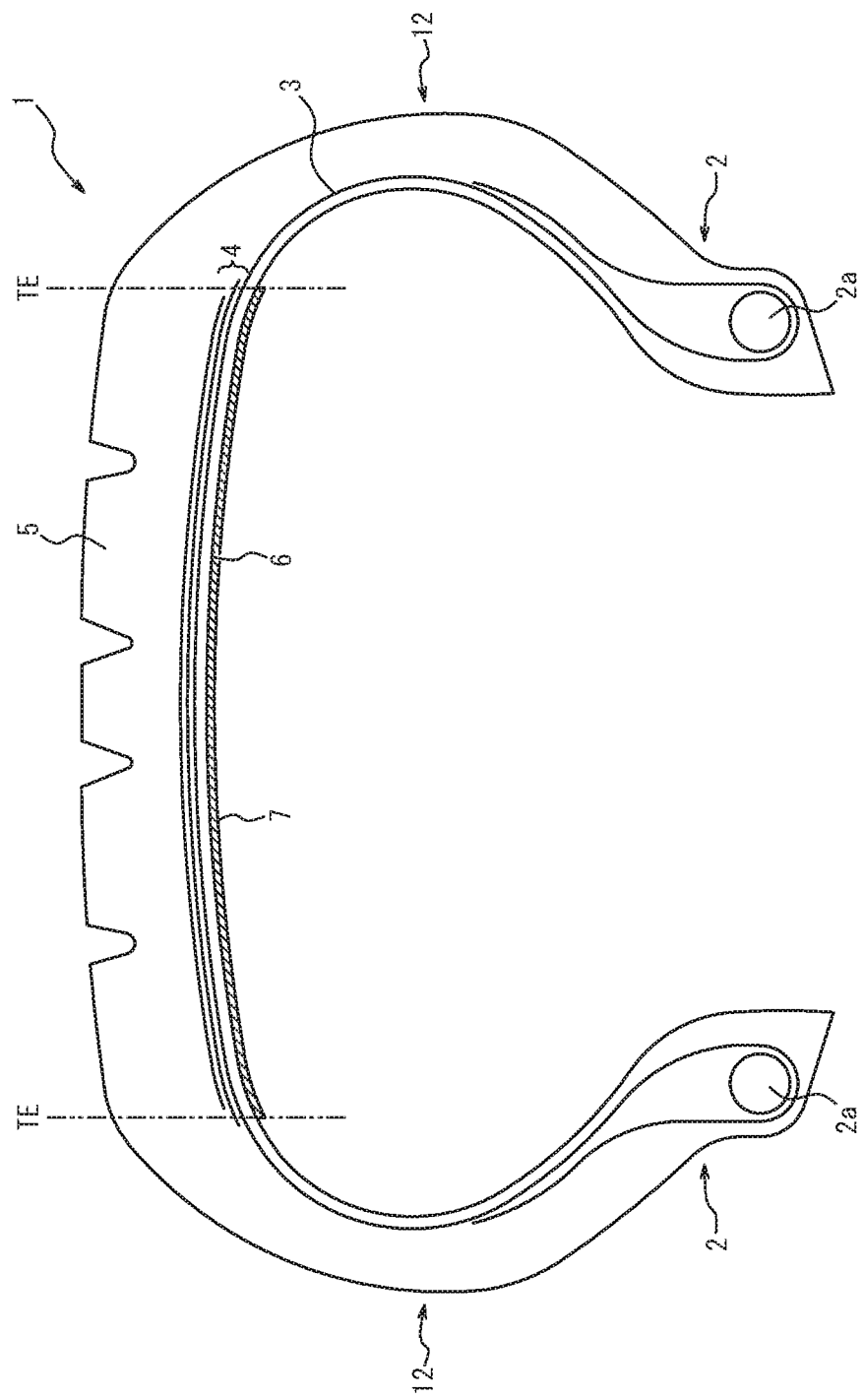
FIG. 1 is a tire widthwise cross-sectional view of a pneumatic tire according to one of the disclosed embodiments.

FIG. 1 is a tire widthwise cross-sectional view of a pneumatic tire according to one of the disclosed embodiments. FIG. 1 illustrates a tire widthwise cross section in a state in which a pneumatic tire 1 is attached to an applicable rim, filled to a prescribed internal pressure, and placed under no load. As illustrated in FIG. 1, the pneumatic tire 1 (hereafter also simply referred to as "tire") includes a belt 4 composed of one or more belt layers (two layers in the illustrated example) and a tread 5 in this order, on the tire radial outer side of a carcass 3 toroidally extending between bead cores 2a buried in a pair of bead portions 2.

The internal structure of the tire is not limited except the below-described puncture prevention member adhered to the inner surface of the tire body, and may be any internal structure according to conventional techniques. For example, the bead cores may be omitted. The material and the number of carcass plies are not limited, and the number of belt layers is not limited.

Herein, the "applicable rim" is an approved rim ("measuring rim" in ETRTO Standards Manual, "design rim" in TRA Year Book) in applicable size that is described or will be described in the future in an effective industrial standard in areas where tires are produced or used, such as JATMA (Japan Automobile Tyre Manufacturers Association) Year Book in Japan, ETRTO (European Tyre and Rim Technical Organisation) Standards Manual in Europe, or TRA (Tire and Rim Association, Inc.) Year Book in the United States (The "rim" thus includes not only current size but also a size that may be included in the industrial standard in the future. An example of the "size that will be described in the future" is the size described as "future developments" in ETRTO Standards Manual 2013). In the case of a size not described in the industrial standard, the "applicable rim" refers to a rim whose width corresponds to the bead width of the tire. The "prescribed internal pressure" denotes the air pressure (maximum air pressure) corresponding to the tire maximum load capability according to the standard such as JATMA for tires of the applicable size. In the case of a size not described in the industrial standard, the "prescribed internal pressure" denotes the air pressure (maximum air pressure) corresponding to the maximum load capability defined for each vehicle on which the tire is to be mounted. The below-described "maximum load" denotes the load corresponding to the tire maximum load capability according to the standard such as JATMA for tires of the applicable size. In the case of a size not described in the industrial standard, the "maximum load" denotes the load corresponding to the maximum load capability defined for each vehicle on which the tire is to be mounted.

In the tire according to this embodiment, a puncture prevention member 7 is adhered to at least a part of the inner surface 6 of the tire body, as illustrated in FIG. 1. In this embodiment, the puncture prevention member 7 is provided only on the inner surface 6 of the tire body in a tire widthwise region between the tread edges TE of the tread 5 (hereafter also referred to as "tread portion inner surface"), and not in other regions (the sidewall portion inner surface and the bead portion inner surface). In this example, the puncture prevention member 7 is adhered to at least a part of the inner surface 6 of the tire body. Specifically, the puncture prevention member 7 is adhered to only both ends (e.g. a region of 3% of the peripheral length of the whole tread inner surface) of the tread portion inner surface, and is not adhered to the other region of the tread portion inner surface. Alternatively, in the present disclosure, the whole surface of the puncture prevention member 7 may be adhered to the inner surface 6 of the tire body, with at least a part of the puncture prevention member 7 being configured to separate from the inner surface 6 of the tire body at the time of nail insertion. In any of these cases, the effect of sufficiently dispersing the input of force by the below-described nail 11 can be achieved. In the case where the puncture prevention member 7 is adhered to at least a part of the inner surface 6 of the tire body, the input of force by the nail 11 can be dispersed uniformly. In the case where the whole surface of the puncture prevention member 7 is adhered to the inner surface 6 of the tire body with at least a part of the puncture prevention member 7 being configured to separate from the inner surface 6 of the tire body at the time of nail insertion, manufacturing man-hours can be reduced.

Herein, the "tread edges" denote the tire widthwise outermost edges of the contact patch when the tire is attached to the applicable rim, filled to the prescribed internal pressure, and placed under the maximum load.

In FIG. 1, the puncture prevention member 7 is illustrated in a simplified form. The puncture prevention member 7 will be described in detail below, with reference to FIGS. 2A to 2D.

Figure 2A:
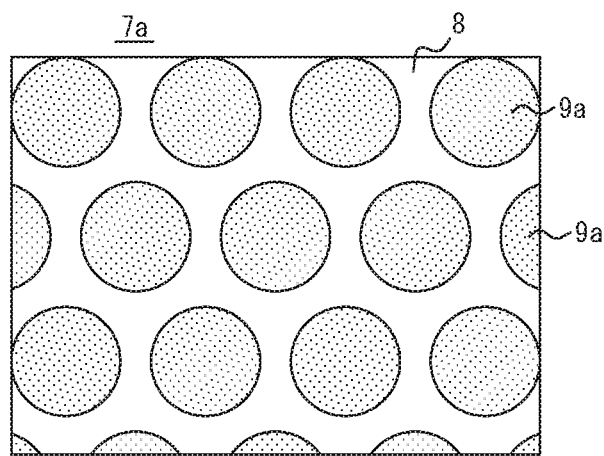
FIG. 2A is a plan view illustrating a first protective layer in a laminate structure of a puncture prevention member.
Figure 2B:
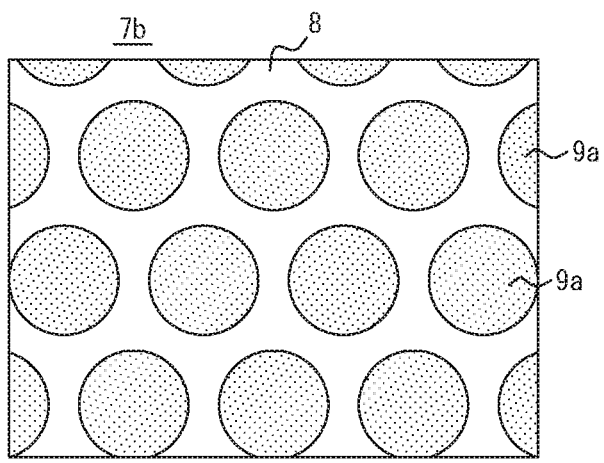
FIG. 2B is a plan view illustrating a second protective layer in the laminate structure of the puncture prevention member.
Figure 2C:
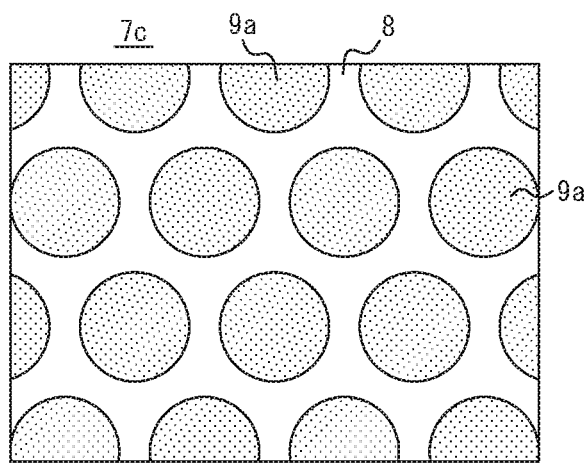
FIG. 2C is a plan view illustrating a third protective layer in the laminate structure of the puncture prevention member.
Figure 2D:
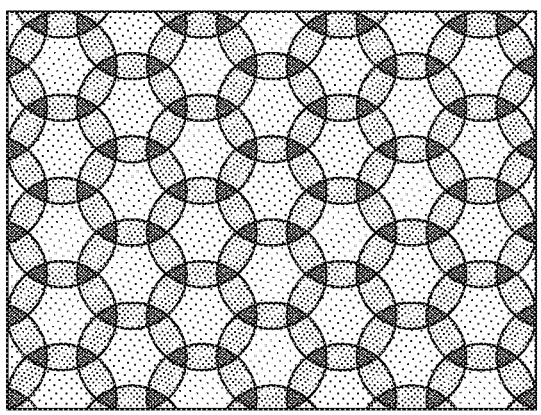
FIG. 2D is a perspective plan view illustrating a structure in which the first to third protective layers of the puncture prevention member are laminated.

FIG. 2A is a plan view illustrating a first protective layer 7a in a laminate structure of the puncture prevention member 7. FIG. 2B is a plan view illustrating a second protective layer 7b in the laminate structure of the puncture prevention member 7. FIG. 2C is a plan view illustrating a third protective layer 7c in the laminate structure of the puncture prevention member 7. FIG. 2D is a perspective plan view illustrating a structure in which the first protective layer 7a to the third protective layer 7c of the puncture prevention member 7 are laminated. The puncture prevention member 7 in this example is composed of a plurality of (three in this example) protective layers 7a to 7c, as illustrated in FIGS. 2A to 2D. Alternatively, in the present disclosure, the puncture prevention member 7 may be composed of a single layer.

In this embodiment, the puncture prevention member 7 includes one or more (three in this example) protective layers 7a to 7c each of which includes: an internal pressure retention layer 8; and a protective material 9a located on the tire outer surface side of the internal pressure retention layer 8 in at least a part of the extending region of the internal pressure retention layer 8 (thin-film rubber in this example), as illustrated in FIGS. 2A to 2D.

As illustrated in FIGS. 2A to 2C, a plurality of protective materials 9a circular in planar view are arranged in each of the plurality of protective layers 7a to 7c laminated in the puncture prevention member 7. As illustrated in FIG. 2D, the plurality of protective materials 9a in each layer are arranged out of phase with the plurality of protective materials 9a in each of the other layers so that at least one protective material 9a is present when the puncture prevention member 7 is viewed in the lamination direction of the plurality of layers (three layers in this example).

More specifically, in this embodiment, in the first protective layer 7a illustrated in FIG. 2A, protective materials 9a circular in planar view are arranged at predetermined equal spacing in the row direction (the horizontal direction in the drawing), in each of a plurality of rows (i.e. the arrangement is repeated in the column direction, which is the vertical direction in the drawing). In the illustrated example, the shortest distance between circular protective materials 9a in one row is less than the radius of one circular protective material 9a.

In the illustrated example, the circular protective materials 9a in one row and the circular protective materials 9a in a row adjacent but one to the row (e.g. odd-numbered columns) are arranged in phase with each other so as to overlap completely when projected in the column direction. Meanwhile, the circular protective materials 9a in one row and the circular protective materials 9a in a row adjacent to the row (an odd-numbered row and an even-numbered row) are arranged out of phase with each other in the row direction by half of the predetermined spacing.

In the second layer 7b, circular protective materials 9a are arranged as in the first layer 7a, as illustrated in FIG. 2B. The positional relationship between the circular protective materials 9a in the first layer 7a illustrated in FIG. 2A and the circular protective materials 9a in the second layer 7b illustrated in FIG. 2B is that the protective materials 9a in the second layer 7b are displaced by half pitch in the column direction (half of the pitch interval in the column direction) with respect to the protective materials 9a in the first layer 7a.

In the third layer 7c, circular protective materials 9a are arranged as in the first layer 7a, as illustrated in FIG. 2C. The positional relationship between the circular protective materials 9a in the first layer 7a illustrated in FIG. 2A and the circular protective materials 9a in the third layer 7c illustrated in FIG. 2C is that the protective materials 9a in the third layer 7c are displaced by half pitch in the row direction (half of the pitch interval in the row direction) with respect to the protective materials 9a in the first layer 7a.

In a state in which the first layer 7a to the third layer 7c are laminated in the puncture prevention member 7, at least one protective material 9a is present when the puncture prevention member 7 is viewed in the lamination direction of the plurality of layers (three layers in this example), as illustrated in FIG. 2D. More specifically, the puncture prevention member 7 has parts formed by one protective layer (approximately hexagonal parts in perspective planar view, indicated by dots of lowest density), parts formed by two protective layers (approximately quadrangular parts in perspective planar view, indicated by dots of intermediate density), and parts formed by three protective layers (approximately triangular parts in perspective planar view, indicated by dots of highest density), as illustrated in FIG. 2D.

Thus, the plurality of protective materials 9a are arranged out of phase among the layers so that at least one protective material 9a is present when the puncture prevention member 7 is viewed in the lamination direction of the plurality of layers.

In the laminated state, one protective material 9a partially overlaps with the surrounding six protective materials 9a, as illustrated in FIG. 2D. The center positions of the surrounding six protective materials 9 form a hexagonal shape in this perspective plan view.

The lamination order of the first protective layer 7a to the third protective layer 7c is not limited, and may be any of all possible lamination orders.

In the structure illustrated in FIGS. 2A to 2D, the internal pressure retention layer 8 may be 0.05 mm to 1 mm in thickness and be made of a material selected from natural rubber, synthetic rubbers such as butadiene rubber, styrene butadiene rubber, isoprene rubber, butyl rubber, and nitrile rubber, thermoplastic elastomers such as styrene-based elastomer, olefin-based elastomer, ester-based elastomer, urethane-based elastomer, and polyamide-based elastomer, and blends thereof. In the present disclosure, the protective material 9a may be 0.05 mm to 3 mm in thickness and be made of a material selected from non-woven fabrics, films, rubbers, steel sheets, and combinations thereof.

The effects according to this embodiment will be described below.

Figure 3A:
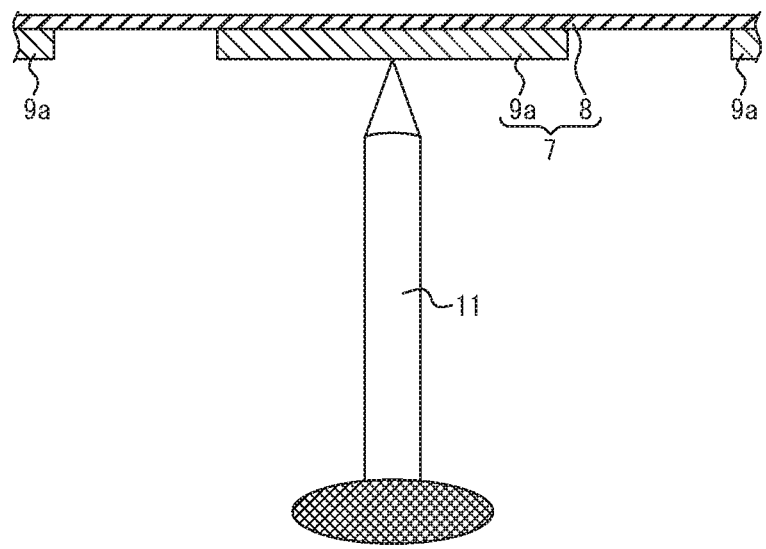
FIG. 3A is a schematic cross-sectional view illustrating a state immediately before a nail sticks into the puncture prevention member.
Figure 3B:
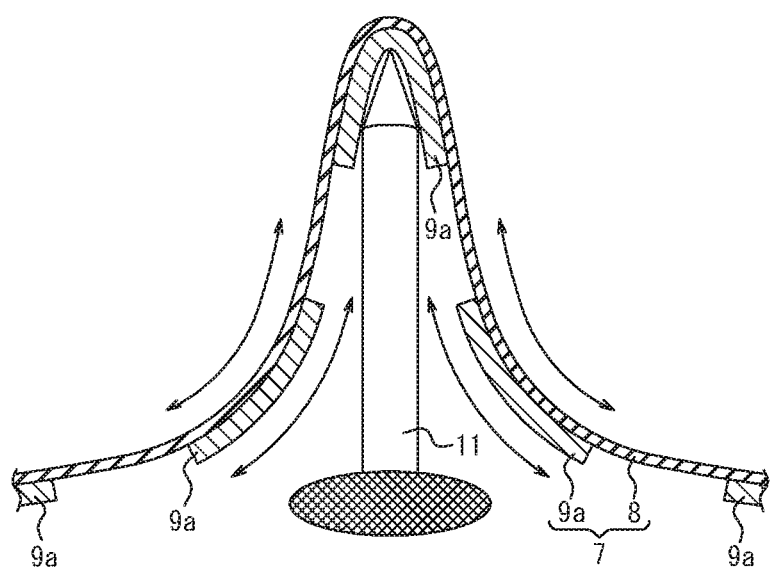
FIG. 3B is a schematic cross-sectional view illustrating a state when the nail sticks into the puncture prevention member.

FIG. 3A is a schematic cross-sectional view illustrating a state immediately before the nail 11 sticks into the puncture prevention member 7. FIG. 3B is a schematic cross-sectional view illustrating a state in which the nail 11 sticks into the puncture prevention member 7. As illustrated in FIGS. 3A and 3B, in the case where the nail 11 sticks into the tread portion in the tire according to this embodiment, the protective material 9a can protect the puncture prevention member 7 from being broken by the tip of the nail 11. In this embodiment, since at least one protective material 9a is present when the puncture prevention member 7 is viewed in the lamination direction of the plurality of layers, this effect can be achieved in any part of the tread portion inner surface. Moreover, in this embodiment, the internal pressure retention layer 8 is provided. As a result of the internal pressure retention layer 8 stretching for the input of force by the nail 11, the input of force can be dispersed. Thus, a break of the puncture prevention member 7 caused by the input of force by the nail 11 can be suppressed, and the puncture resistance of the tire can be improved.

The tire according to this embodiment therefore has improved puncture resistance.

In the present disclosure, preferably, the protective layers 7a to 7c each include the internal pressure retention layer 8, and further include at least one selected from the group of a woven fabric and a knitted fabric on a region, the region is located in the tire outer surface side of the internal pressure retention layer 8 and in the tire inner side of the protective material 9a. The extending region of the woven fabric or the knitted fabric may be, for example, the same as the extending region of the internal pressure retention layer 8. In this embodiment, a woven fabric using elastic polyurethane or polytrimethylene terephthalate or a knitted fabric using organic fibers, such as polyester or nylon, used in general industrial products may be used. These are merely examples, and the material is not limited to such. The woven fabric or the knitted fabric may be, for example, obtained by weaving or knitting threads or cords having a fineness of 10 dtex to 1100 dtex.

As a result of at least one of the woven fabric and the knitted fabric stretching for the input of force by the nail 11, the input of force can be further dispersed. Moreover, the provision of any of the woven fabric and the knitted fabric can enhance the effect of preventing the internal pressure retention layer 8 from flowing out of the punctured part due to the air pressure inside the tire after the nail 11 comes out.

In the present disclosure, preferably, the puncture prevention member 7 includes the laminated plurality of protective layers 7a to 7c, the plurality of protective materials 9a circular in planar view are arranged in each layer, and the plurality of protective materials 9a in each layer are arranged out of phase with the plurality of protective materials 9a in each of the other layers so that at least one protective material 9a is present when the puncture prevention member 7 is viewed in the lamination direction of the plurality of layers.

Hence, the effect of the protective material 9a protecting the puncture prevention member 7 from being broken by the tip of the nail 11 can be achieved in any part.

In this embodiment, preferably, relational expressions $$S \geq 100 \times M \times T + 4.5, \text{ and } Y/(M \times T) \geq 2$$

are satisfied, where M (MPa) is the 100% modulus of a part of the puncture prevention member 7 having the lowest 100% modulus, T (mm) is the thickness of the part of the puncture prevention member 7, Y (N/mm) is the initial rigidity at the time of nail insertion, and S (N) is the penetration strength of a part of the puncture prevention member 7 having the highest penetration strength.

By providing the puncture prevention member 7 that satisfies the relational expressions and is easy to stretch relative to the breaking strength, the input of force by the nail 11 can be sufficiently dispersed to suppress a break of the puncture prevention member 7 caused by the input of force by the nail 11, and thus the puncture resistance of the tire can be further improved.

Herein, the "100% modulus" is the tensile stress at 100% elongation, measured by preparing a dumbbell No. 3 sample and conducting a tensile test under the conditions of a room temperature of 23° C. and a speed of 500±25 mm/min in accordance with JIS K6251.

Herein, the "penetration strength" is measured as follows: An N100 nail prescribed in JIS and a cut sample of 80 mm in diameter of the foregoing puncture prevention member are prepared, the cut sample is attached to a pressure resistant chamber, and, in a state of applying an internal pressure of 230 kPa, a force is exerted on the cut sample by the nail. The force exerted on the nail when the nail penetrates the cut sample or the cut sample breaks is taken to be the penetration strength. In the case where the cut sample does not break even when the entire nail has been inserted, the force exerted on the nail at the time is taken to be the penetration strength.

The "initial rigidity at the time of nail insertion" is the change of the force exerted on the nail when the nail insertion quantity of a stress-nail insertion quantity curve defined by the nail insertion quantity in the horizontal axis and the force exerted on the nail in the vertical axis is 3 mm to 10 mm in the foregoing nail penetration test.

As an example, the puncture prevention member 7 satisfying the foregoing relational expressions can be obtained by using the structure illustrated in FIGS. 2A to 2D and the materials described above.

As another example, the puncture prevention member 7 satisfying the foregoing relational expressions can also be obtained by using the structure in which at least one of a woven fabric and a knitted fabric is further provided on the tire outer surface side of the internal pressure retention layer 8 and on the tire inner side of the protective material 9a and using the materials described above.

The thickness T is preferably 0.05 mm or more.

In the present disclosure, the 100% modulus M of the part of the puncture prevention member 7 having the lowest 100% modulus is preferably 0.1 MPa to 10 MPa.

As a result of the 100% modulus M being 0.1 MPa or more, the production operability as a member can be ensured. As a result of the 100% modulus M being 10 MPa or less, the puncture resistance can be further improved.

For the same reason, the 100% modulus M of the part of the puncture prevention member 7 having the lowest 100% modulus is preferably 0.2 MPa to 7 MPa, and more preferably 0.2 MPa to 3 MPa.

In the present disclosure, the penetration strength S is preferably 45 N or more. As a result of the penetration strength S being 45 N or more, sufficient strength can be ensured against external input of force, to prevent a break by penetration. In the present disclosure, the penetration strength S is preferably 60 N or more. Thus, the puncture resistance can be ensured against larger input of force for the same reason as above.

In the present disclosure, the nail insertion quantity L at the time of nail penetration is preferably 20 mm or more. In this way, the input of force by the nail can be dispersed sufficiently, and the puncture resistance can be improved. In the present disclosure, the nail insertion quantity L at the time of nail penetration is preferably 50 mm or more. Thus, the puncture resistance can be improved against larger input of force for the same reason as above.

Herein, the "nail insertion quantity at the time of nail penetration" is the nail insertion quantity when the nail penetrates the cut sample or the cut sample breaks. In the case where the cut sample does not break even when the entire nail has been inserted, L=80 mm.

In the present disclosure, the gas permeability coefficient of a part of the puncture prevention member 7 having the highest gas permeability coefficient at 60° C. is preferably $6.0 \times 10^{-10}$ cc·cm/cm²·sec·cmHg or less.

This can enhance the effect of retaining the internal pressure of the tire.

Although the foregoing embodiment describes the case where the number of protective layers is three, the number of protective layers may be two or four or more in the present disclosure. In these cases, too, the protective layers are preferably configured so that at least one protective material 9a is present when the puncture prevention member 7 is viewed in the lamination direction of the plurality of layers. Moreover, in these cases, it is preferable that the puncture prevention member 7 includes the laminated plurality of protective layers, the plurality of protective materials 9a circular in planar view are arranged in each layer, and the plurality of protective materials 9a in each layer are arranged out of phase with the plurality of protective materials 9a in each of the other layers so that at least one protective material 9a is present when the puncture prevention member 7 is viewed in the lamination direction of the plurality of layers, for the same reason as above.

Although the foregoing embodiment describes the case where the protective materials 9a are circular in planar view, the protective materials 9a in the present disclosure may have any of various shapes in planar view, including an ellipse, polygons such as a triangle, a quadrangle, a hexagon, and an octagon, and combinations of two or more thereof.

Figure 4A:
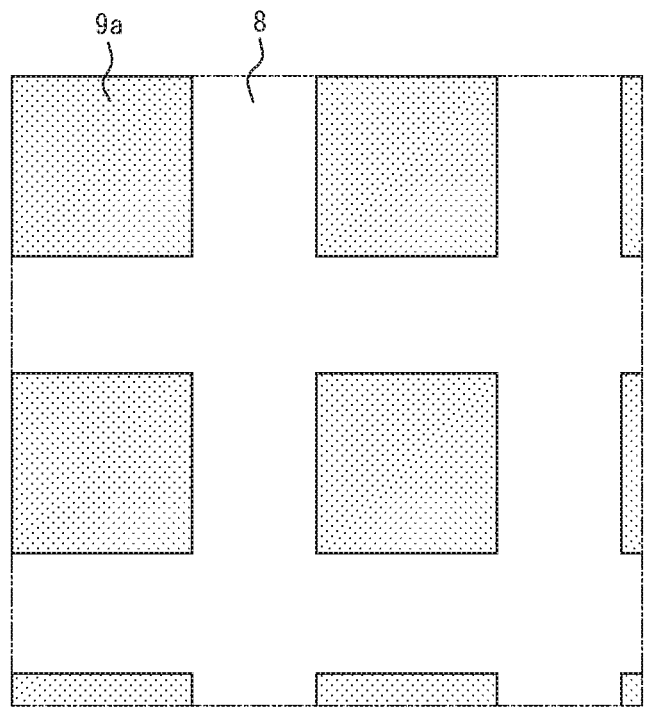
FIG. 4A is a plan view illustrating a first protective layer in a laminate structure of a puncture prevention member according to another embodiment.
Figure 4B:
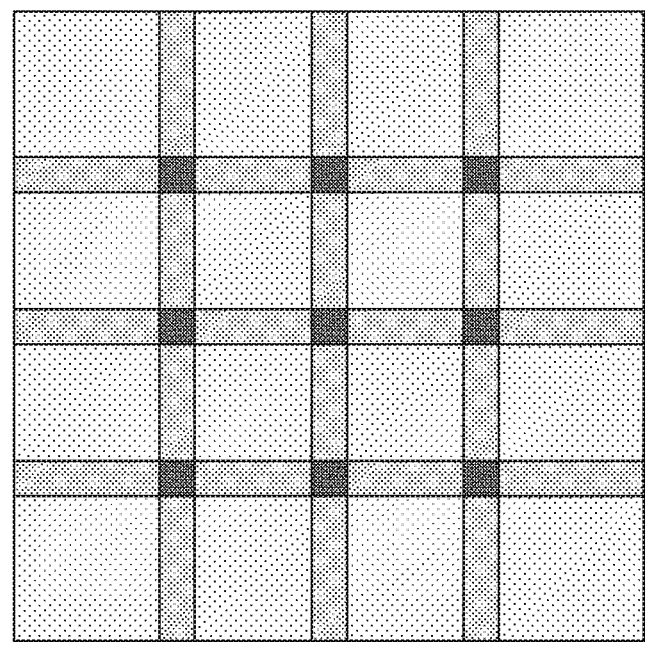
FIG. 4B is a perspective plan view illustrating a structure in which the first to fourth protective layers of the puncture prevention member according to the embodiment are laminated.

FIG. 4A is a plan view illustrating a first protective layer in a laminate structure of a puncture prevention member according to another embodiment. FIG. 4B is a perspective plan view illustrating a structure in which the first to fourth protective layers of the puncture prevention member according to this embodiment are laminated.

In this example, a puncture prevention member 7 includes one or more (four in this example) protective layers each of which includes: an internal pressure retention layer 8; and a protective material 9a located on the tire outer surface side of the internal pressure retention layer 8 in at least a part of the extending region of the internal pressure retention layer 8 (thin-film rubber in this example).

As illustrated in FIG. 4A for the first layer as a representative example, a plurality of protective materials 9a quadrangular in planar view are arranged (two rows and two columns in the range illustrated in the drawing) in each protective layer in the puncture prevention member 7. As illustrated in FIG. 4B, the plurality of protective materials 9a in each layer are arranged out of phase with the plurality of protective materials 9a in each of the other layers so that at least one protective material 9a is present when the puncture prevention member 7 is viewed in the lamination direction of the plurality of layers (four layers in this example).

The second to fourth protective layers (not illustrated) are used besides the protective layer illustrated in FIG. 4A. As can be understood from FIG. 4B, in the second protective layer, protective materials 9a quadrangular in planar view are arranged out of phase with the protective materials 9a in the first protective layer only in the column direction. In the third protective layer, protective materials 9a quadrangular in planar view are arranged out of phase with the protective materials 9a in the first protective layer only in the row direction. In the fourth protective layer, protective materials 9a quadrangular in planar view are arranged out of phase with the protective materials 9a in the second protective layer only in the row direction.

In a state in which the first to fourth layers are laminated in the puncture prevention member 7, at least one protective material 9a is present when the puncture prevention member 7 is viewed in the lamination direction of the plurality of layers (four layers in this example), as illustrated in FIG. 4B. More specifically, the puncture prevention member 7 has parts formed by one protective layer (quadrangular parts in perspective planar view, indicated by dots of lowest density), parts formed by two protective layers (quadrangular parts in perspective planar view, indicated by dots of intermediate density), and parts formed by four protective layers (quadrangular parts in perspective planar view, indicated by dots of highest density), as illustrated in FIG. 4B.

Thus, the plurality of protective materials 9a are arranged out of phase among the layers so that at least one protective material 9a is present when the puncture prevention member 7 is viewed in the lamination direction of the plurality of layers.

The lamination order of the first to fourth protective layers is not limited, and may be any of all possible lamination orders.

In the structure illustrated in FIGS. 4A and 4B, the internal pressure retention layer 8 may be 0.05 mm to 1 mm in thickness and be made of a material selected from natural rubber, synthetic rubbers such as butadiene rubber, styrene butadiene rubber, isoprene rubber, butyl rubber, and nitrile rubber, thermoplastic elastomers such as styrene-based elastomer, olefin-based elastomer, ester-based elastomer, urethane-based elastomer, and polyamide-based elastomer, and blends thereof. In the present disclosure, the protective material 9a may be 0.05 mm to 3 mm in thickness and be made of a material selected from non-woven fabrics, films, rubbers, steel sheets, and combinations thereof.

Figure 5A:
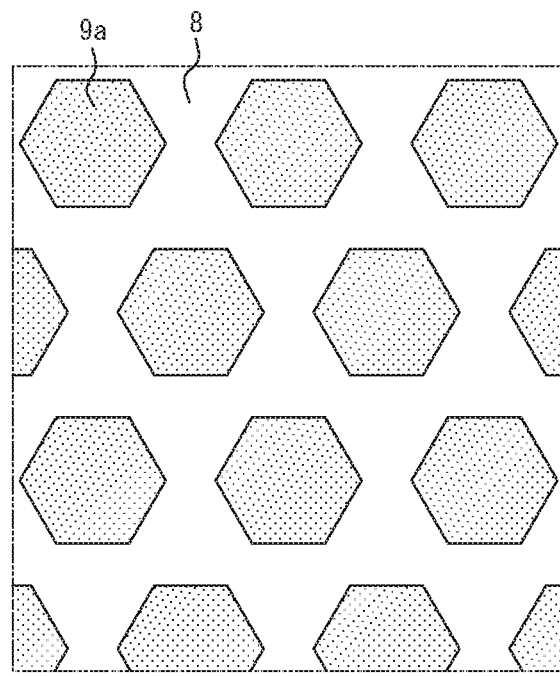
FIG. 5A is a plan view illustrating a first protective layer in a laminate structure of a puncture prevention member according to another embodiment.
Figure 5B:
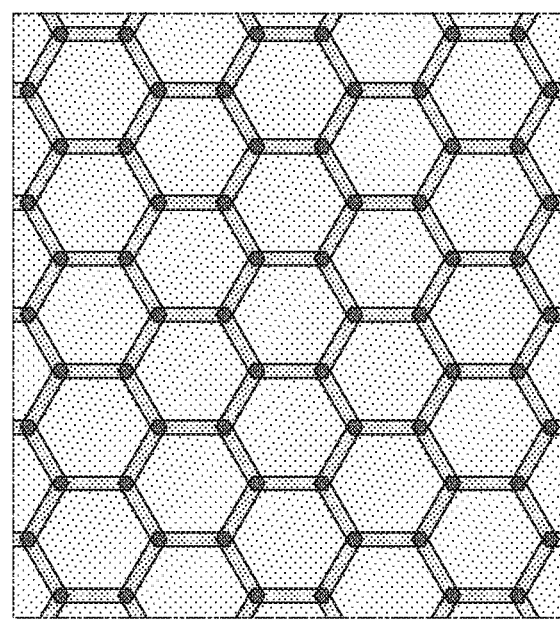
FIG. 5B is a perspective plan view illustrating a structure in which the first to third protective layers of the puncture prevention member according to the embodiment are laminated.

FIG. 5A is a plan view illustrating a first protective layer in a laminate structure of a puncture prevention member according to another embodiment. FIG. 5B is a perspective plan view illustrating a structure in which the first to third protective layers of the puncture prevention member according to this embodiment are laminated.

In this example, a puncture prevention member 7 includes one or more (three in this example) protective layers each of which includes: an internal pressure retention layer 8; and a protective material 9a located on the tire outer surface side of the internal pressure retention layer 8 in at least a part of the extending region of the internal pressure retention layer 8 (thin-film rubber in this example).

As illustrated in FIG. 5A for the first layer as a representative example, a plurality of protective materials 9a hexagonal in planar view are arranged in each protective layer in the puncture prevention member 7. As illustrated in FIG. 5B, the plurality of protective materials 9a in each layer are arranged out of phase with the plurality of protective materials 9a in each of the other layers so that at least one protective material 9a is present when the puncture prevention member 7 is viewed in the lamination direction of the plurality of layers (three layers in this example).

The second and third protective layers (not illustrated) are used besides the protective layer illustrated in FIG. 5A. As can be understood from FIG. 5B, in the second protective layer, protective materials 9a hexagonal in planar view are arranged out of phase with the protective materials 9a in the first protective layer only in the column direction (⅓ of the pitch in the column direction). In the third protective layer, protective materials 9a hexagonal in planar view are arranged out of phase with the protective materials 9a in the first protective layer only in the column direction (⅔ of the pitch in the column direction).

In a state in which the first to third layers are laminated in the puncture prevention member 7, at least one protective material 9a is present when the puncture prevention member 7 is viewed in the lamination direction of the plurality of layers (three layers in this example), as illustrated in FIG. 5B. More specifically, the puncture prevention member 7 has parts formed by one protective layer (approximately hexagonal parts in perspective planar view, indicated by dots of lowest density), parts formed by two protective layers (approximately quadrangular parts in perspective planar view, indicated by dots of intermediate density), and parts formed by three protective layers (hexagonal parts in perspective planar view, indicated by dots of highest density), as illustrated in FIG. 5B.

Thus, the plurality of protective materials 9a are arranged out of phase among the layers so that at least one protective material 9a is present when the puncture prevention member 7 is viewed in the lamination direction of the plurality of layers.

The lamination order of the first to third protective layers is not limited, and may be any of all possible lamination orders.

In the structure illustrated in FIGS. 5A and 5B, the internal pressure retention layer 8 may be 0.05 mm to 1 mm in thickness and be made of a material selected from natural rubber, synthetic rubbers such as butadiene rubber, styrene butadiene rubber, isoprene rubber, butyl rubber, and nitrile rubber, thermoplastic elastomers such as styrene-based elastomer, olefin-based elastomer, ester-based elastomer, urethane-based elastomer, and polyamide-based elastomer, and blends thereof. In the present disclosure, the protective material 9a may be 0.05 mm to 3 mm in thickness and be made of a material selected from non-woven fabrics, films, rubbers, steel sheets, and combinations thereof.

Figure 6A:
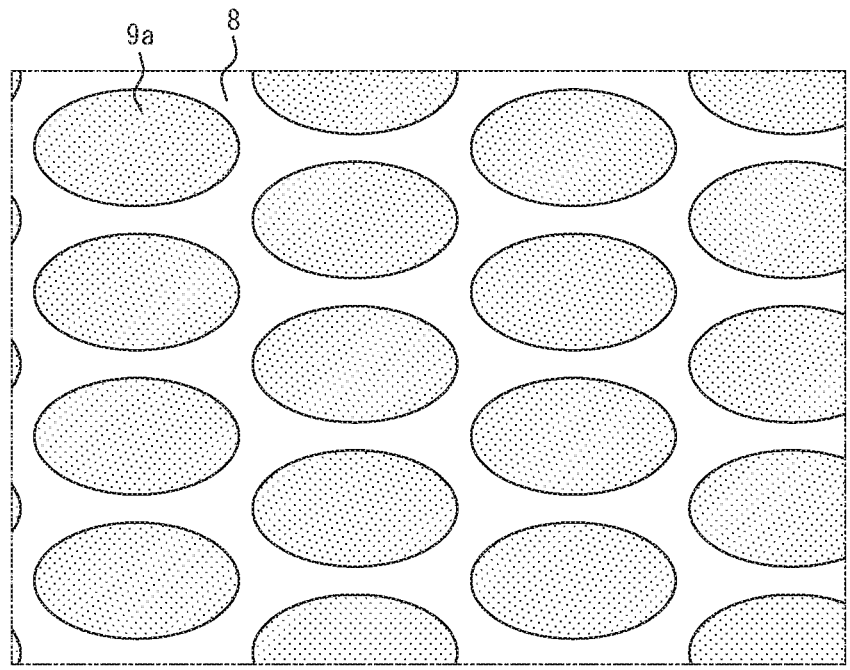
FIG. 6A is a plan view illustrating a first protective layer in a laminate structure of a puncture prevention member according to another embodiment.
Figure 6B:
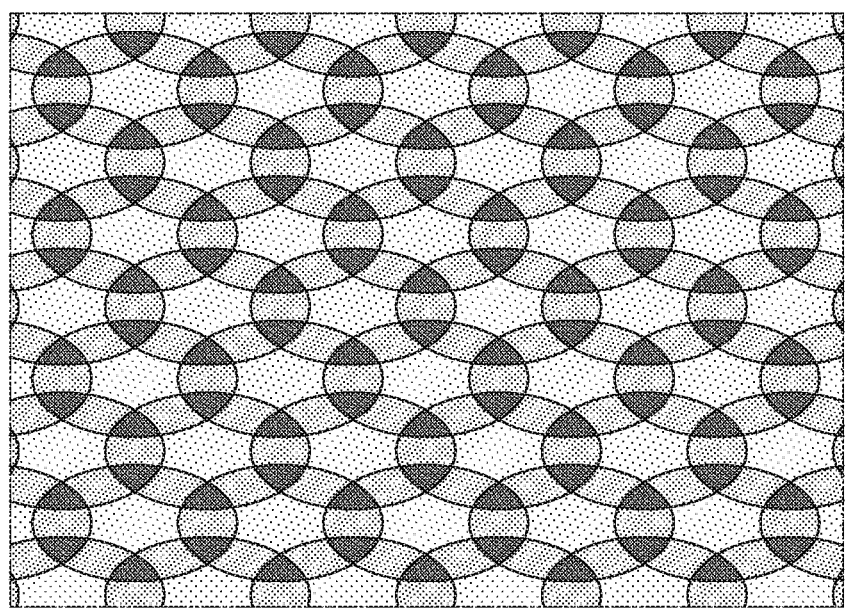
FIG. 6B is a perspective plan view illustrating a structure in which the first to third protective layers of the puncture prevention member according to the embodiment are laminated.

FIG. 6A is a plan view illustrating a first protective layer in a laminate structure of a puncture prevention member according to another embodiment. FIG. 6B is a perspective plan view illustrating a structure in which the first to third protective layers of the puncture prevention member according to this embodiment are laminated.

In this example, a puncture prevention member 7 includes one or more (three in this example) protective layers each of which includes: an internal pressure retention layer 8; and a protective material 9a located on the tire outer surface side of the internal pressure retention layer 8 in at least a part of the extending region of the internal pressure retention layer 8 (thin-film rubber in this example).

As illustrated in FIG. 6A for the first layer as a representative example, a plurality of protective materials 9a elliptic in planar view are arranged in each protective layer in the puncture prevention member 7. As illustrated in FIG. 6B, the plurality of protective materials 9a in each layer are arranged out of phase with the plurality of protective materials 9a in each of the other layers so that at least one protective material 9a is present when the puncture prevention member 7 is viewed in the lamination direction of the plurality of layers (three layers in this example).

The second and third protective layers (not illustrated) are used besides the protective layer illustrated in FIG. 6A. As can be understood from FIG. 6B, in the second protective layer, protective materials 9a elliptic in planar view are arranged out of phase with the protective materials 9a in the first protective layer only in the row direction (⅓ of the pitch in the row direction). In the third protective layer, protective materials 9a elliptic in planar view are arranged out of phase with the protective materials 9a in the first protective layer only in the row direction (⅔ of the pitch in the row direction).

In a state in which the first to third layers are laminated in the puncture prevention member 7, at least one protective material 9a is present when the puncture prevention member 7 is viewed in the lamination direction of the plurality of layers (three layers in this example), as illustrated in FIG. 6B. More specifically, the puncture prevention member 7 has parts formed by one protective layer (indicated by dots of lowest density), parts formed by two protective layers (indicated by dots of intermediate density), and parts formed by three protective layers (approximately triangular parts in perspective planar view, indicated by dots of highest density), as illustrated in FIG. 6B.

Thus, the plurality of protective materials 9a are arranged out of phase among the layers so that at least one protective material 9a is present when the puncture prevention member 7 is viewed in the lamination direction of the plurality of layers.

The lamination order of the first to third protective layers is not limited, and may be any of all possible lamination orders.

In the structure illustrated in FIGS. 6A and 6B, the internal pressure retention layer 8 may be 0.05 mm to 1 mm in thickness and be made of a material selected from natural rubber, synthetic rubbers such as butadiene rubber, styrene butadiene rubber, isoprene rubber, butyl rubber, and nitrile rubber, thermoplastic elastomers such as styrene-based elastomer, olefin-based elastomer, ester-based elastomer, urethane-based elastomer, and polyamide-based elastomer, and blends thereof. In the present disclosure, the protective material 9a may be 0.05 mm to 3 mm in thickness and be made of a material selected from non-woven fabrics, films, rubbers, steel sheets, and combinations thereof.

Figure 7A:
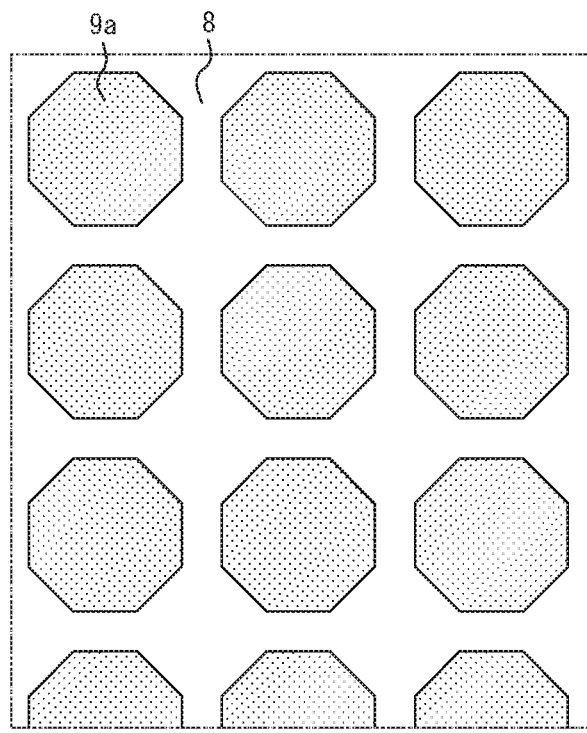
FIG. 7A is a plan view illustrating a first protective layer in a laminate structure of a puncture prevention member according to another embodiment.
Figure 7B:
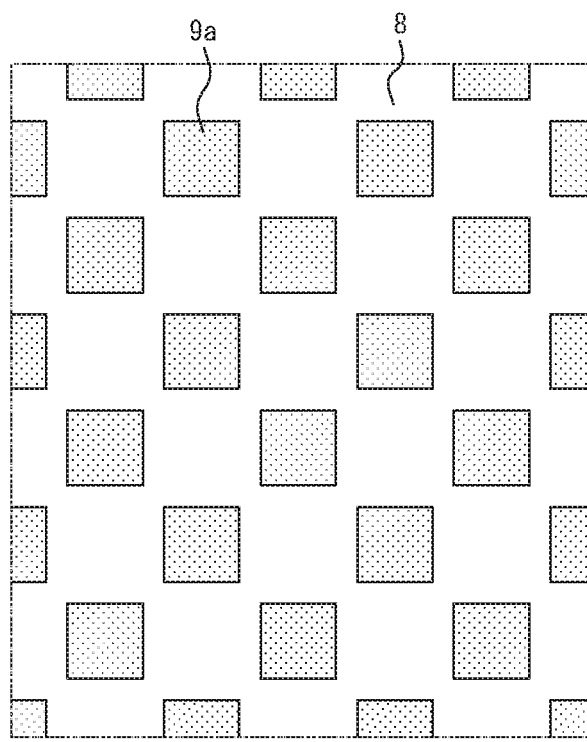
FIG. 7B is a plan view illustrating a second protective layer in the laminate structure of the puncture prevention member according to the embodiment.
Figure 7C:
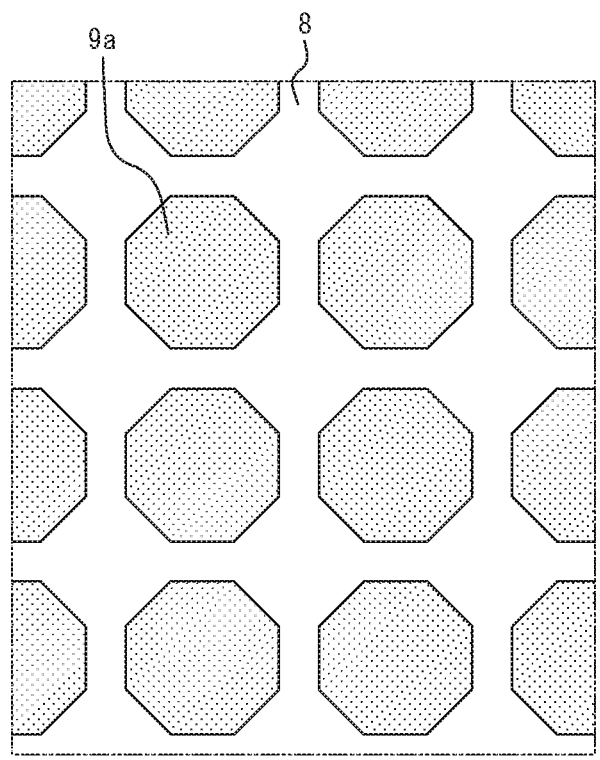
FIG. 7C is a plan view illustrating a third protective layer in the laminate structure of the puncture prevention member according to the embodiment.
Figure 7D:
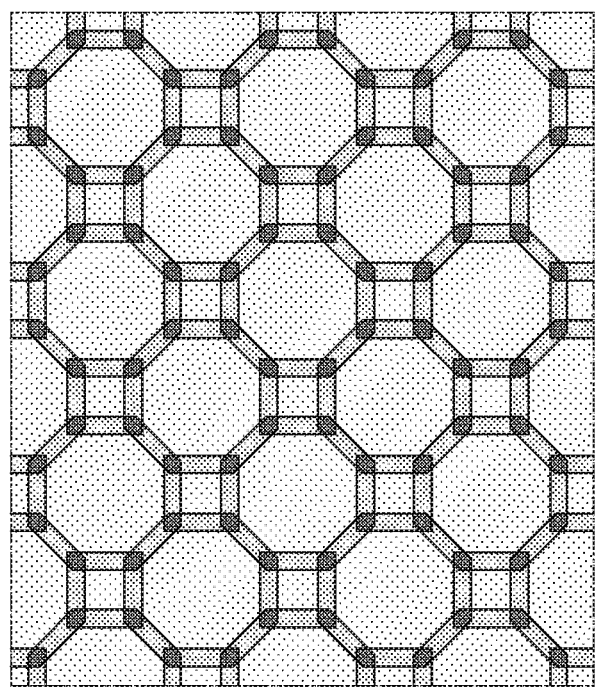
FIG. 7D is a perspective plan view illustrating a structure in which the first to third protective layers of the puncture prevention member according to the embodiment are laminated.

FIG. 7A is a plan view illustrating a first protective layer in a laminate structure of a puncture prevention member according to another embodiment. FIG. 7B is a plan view illustrating a second protective layer in the laminate structure of the puncture prevention member according to this embodiment. FIG. 7C is a plan view illustrating a third protective layer in the laminate structure of the puncture prevention member according to this embodiment. FIG. 7D is a perspective plan view illustrating a structure in which the first to third protective layers of the puncture prevention member according to this embodiment are laminated In this example, a puncture prevention member 7 includes one or more (three in this example) protective layers each of which includes: an internal pressure retention layer 8; and a protective material 9a located on the tire outer surface side of the internal pressure retention layer 8 in at least a part of the extending region of the internal pressure retention layer 8 (thin-film rubber in this example).

In the puncture prevention member 7, a plurality of protective materials 9a octagonal in planar view are arranged in the first layer as illustrated in FIG. 7A, a plurality of protective materials 9a quadrangular in planar view are arranged in the second layer as illustrated in FIG. 7B, and a plurality of protective materials 9a octagonal in planar view are arranged in the third layer as illustrated in FIG. 7C. As illustrated in FIG. 7D, the plurality of protective materials 9a in each layer are arranged out of phase with the plurality of protective materials 9a in each of the other layers so that at least one protective material 9a is present when the puncture prevention member 7 is viewed in the lamination direction of the plurality of layers (three layers in this example).

As can be understood from FIG. 7D, the protective materials 9a quadrangular in planar view in the second protective layer are arranged at the centers between the columns and between the rows of the protective materials 9a octagonal in planar view in the first protective layer. The protective materials 9a octagonal in planar view in the third protective layer are displaced by half pitch from the columns and the rows of the protective materials 9a octagonal in planar view in the first protective layer.

In a state in which the first to third layers are laminated in the puncture prevention member 7, at least one protective material 9a is present when the puncture prevention member 7 is viewed in the lamination direction of the plurality of layers (three layers in this example), as illustrated in FIG. 7D. More specifically, the puncture prevention member 7 has parts formed by one protective layer (indicated by dots of lowest density), parts formed by two protective layers (indicated by dots of intermediate density), and parts formed by three protective layers (indicated by dots of highest density), as illustrated in FIG. 7D.

Thus, the plurality of protective materials 9a are arranged out of phase among the layers so that at least one protective material 9a is present when the puncture prevention member 7 is viewed in the lamination direction of the plurality of layers.

The lamination order of the first to third protective layers is not limited, and may be any of all possible lamination orders.

In the structure illustrated in FIGS. 7A to 7D, the internal pressure retention layer 8 may be 0.05 mm to 1 mm in thickness and be made of a material selected from natural rubber, synthetic rubbers such as butadiene rubber, styrene butadiene rubber, isoprene rubber, butyl rubber, and nitrile rubber, thermoplastic elastomers such as styrene-based elastomer, olefin-based elastomer, ester-based elastomer, urethane-based elastomer, and polyamide-based elastomer, and blends thereof. In the present disclosure, the protective material 9a may be 0.05 mm to 3 mm in thickness and be made of a material selected from non-woven fabrics, films, rubbers, steel sheets, and combinations thereof.

Although the circular protective materials 9a are arranged in the row direction and the column direction in each protective layer in the example illustrated in FIGS. 2A to 2D, the present disclosure is not limited to such. As an example, in each protective layer, protective materials 9 each continuously extending in the row direction may be arranged at spacing in the column direction. As another example, in each protective layer, protective materials 9 each continuously extending in the column direction may be arranged at spacing in the row direction. Such protective layers may be laminated. In these cases, too, the puncture prevention member 7 is preferably configured so that at least one protective material 9a is present when the puncture prevention member 7 is viewed in the lamination direction of the plurality of layers.

Figure 8:
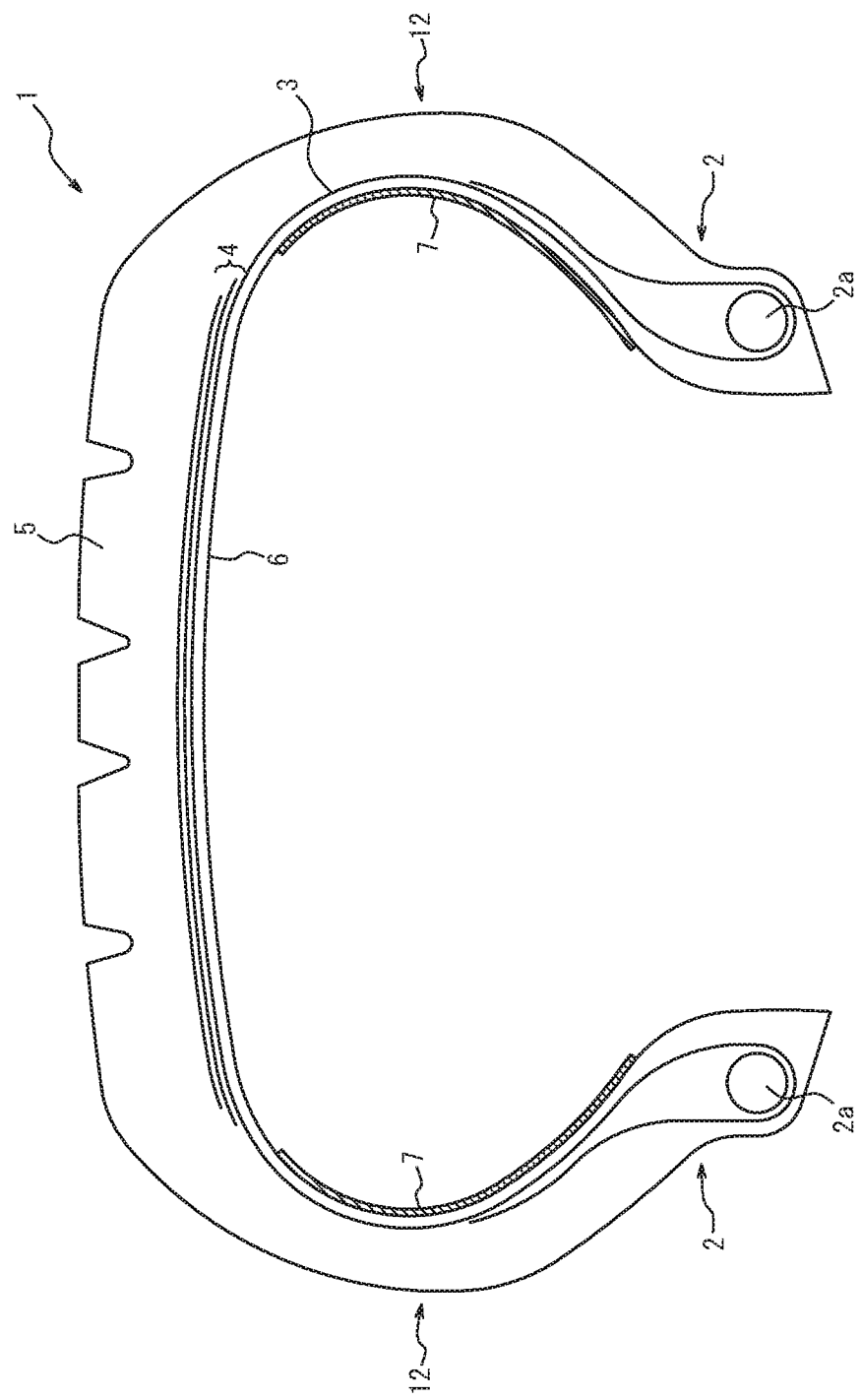
FIG. 8 is a tire widthwise cross-sectional view of a pneumatic tire according to another one of the disclosed embodiments.

FIG. 8 is a tire widthwise cross-sectional view of a pneumatic tire according to another one of the disclosed embodiments.

FIG. 8 illustrates a tire widthwise cross section in a state in which a pneumatic tire 1 is attached to the applicable rim, filled to the prescribed internal pressure, and placed under no load. The tire illustrated in FIG. 8 differs from the tire according to the embodiment illustrated in FIG. 1, in the region adhered by the puncture prevention member 7. Specifically, in the tire illustrated in FIG. 8, the puncture prevention member 7 is adhered to the inner surface 6 of the tire body. The puncture prevention member 7 is provided only on the inner surface of each of the sidewall portions 12 connected to the pair of bead portions 2 (the part of the tire inner surface forming the tire radial region of the sidewall portion 12). The puncture prevention member 7 is adhered to at least a part of the inner surface 6 of the tire body.

Specifically, the puncture prevention member 7 is adhered to only both ends (e.g. a region of 3% of the peripheral length of the whole tire inner surface 6) of the inner surface of each sidewall portion 12, and is not adhered to the other region of the inner surface of the sidewall portion 12.

In the tire according to this embodiment illustrated in FIG. 8, too, in the case where the nail 11 sticks into any of the sidewall portions, the protective material 9a can protect the puncture prevention member 7 from being broken by the tip of the nail 11. In this embodiment, since at least one protective material 9a is present when the puncture prevention member 7 is viewed in the lamination direction of the plurality of layers, this effect can be achieved in any part of the inner surface of each sidewall portion. Moreover, in this embodiment, the internal pressure retention layer 8 is provided. As a result of the internal pressure retention layer 8 stretching for the input of force by the nail 11, the input of force can be dispersed. Thus, a break of the puncture prevention member 7 caused by the input of force by the nail 11 can be suppressed, and the puncture resistance of the tire can be improved. Moreover, even in the case where a cut occurs as a result of the sidewall portion 12 colliding with an obstacle such as a curbstone during vehicle running, a break of the puncture prevention member 7 can be suppressed and the puncture resistance can be improved. The tire according to this embodiment therefore has improved puncture resistance.

In this embodiment, too, it is preferable to further provide any of a woven fabric and a knitted fabric. As a result of any of the woven fabric and the knitted fabric stretching for the input of force by the nail 11, the input of force can be further dispersed.

FIG. 9 is a tire widthwise cross-sectional view of a pneumatic tire according to another one of the disclosed embodiments.

FIG. 9 illustrates a tire widthwise cross section in a state in which a pneumatic tire 1 is attached to the applicable rim, filled to the prescribed internal pressure, and placed under no load. The tire illustrated in FIG. 9 differs from the tires according to the embodiments illustrated in FIGS. 1 and 2, in the region in which the puncture prevention member 7 is located. Specifically, in the tire illustrated in FIG. 9, the puncture prevention member 7 is provided on the whole inner surface 6 of the tire body. The puncture prevention member 7 is adhered to at least a part of the inner surface 6 of the tire body. Specifically, the puncture prevention member 7 is adhered to only the inner surface of each bead portion, and is not adhered to the other regions (the tread portion inner surface and the inner surface of each sidewall portion 12).

In the tire according to this embodiment illustrated in FIG. 9, too, in the case where the nail 11 sticks into the tire, the protective material 9a can protect the puncture prevention member 7 from being broken by the tip of the nail 11. In this embodiment, since at least one protective material 9a is present when the puncture prevention member 7 is viewed in the lamination direction of the plurality of layers, this effect can be achieved in any part of the tire inner surface. Moreover, in this embodiment, the internal pressure retention layer 8 is provided. As a result of the internal pressure retention layer 8 stretching for the input of force by the nail 11, the input of force can be dispersed. Thus, a break of the puncture prevention member 7 caused by the input of force by the nail 11 can be suppressed, and the puncture resistance of the tire can be improved. Moreover, even in the case where a cut occurs as a result of the tire colliding with an obstacle such as a curbstone during vehicle running, a break of the puncture prevention member 7 can be suppressed and the puncture resistance can be improved. The tire according to this embodiment therefore has improved puncture resistance. In this embodiment, too, it is preferable to further provide any of a woven fabric and a knitted fabric. As a result of any of the woven fabric and the knitted fabric stretching for the input of force by the nail 11, the input of force can be further dispersed.

EXAMPLES

To determine the effects according to the present disclosure, tires according to Examples and Comparative Example are produced, and a test of evaluating their puncture resistance is conducted. The tire size of each tire is 195/65R15, and the internal pressure of each tire is 230 kPa. The specifications of each tire are shown in Table 1 together with evaluation results. In each Example, a puncture prevention member is adhered to the inner surface of the tire body. Each protective layer has a structure including an internal pressure retention layer, a protective material provided on the tire outer surface side of the internal pressure retention layer, and a knitted fabric or a woven fabric provided on the tire outer surface side of the internal pressure retention layer and on the tire inner side of the protective material. As the synthetic rubber thin film used in the internal pressure retention layer, a rubber thin film based on butyl rubber is used. As the thin film used in the internal pressure retention layer, a thin film made of an ethylene-vinylalcohol copolymer and a thermoplastic urethane-based elastomer is used. As the protective material, a film or a non-woven fabric made of polyester is used. In Comparative Example, an inner liner made of butyl rubber is provided on the inner surface of the tire body.

<Puncture Resistance>

The puncture prevention member is provided on the tire inner surface, an N100 nail is pushed in so that the nail tip of 20 mm is exposed from the outer surface, and the air leakage after the nail is pulled out is evaluated. An air retention rate of 100 immediately from the pulling is evaluated as good, and an air retention rate of 99 or less immediately from the pulling is evaluated as poor.

The evaluation results of each test are shown in Table 1.

TABLE 1

| | Tire stucture | | | Example 1 FIG. 1 | Example 2 FIG. 1 | Example 3 FIG. 1 | Example 4 FIG. 1 | Example 5 FIG. 1 | Comparative Example F1G. 1 |
|---|---|---|---|---|---|---|---|---|---|
| Member | Internal pressure retention layer | | | Synthetic rubber thin film | Film | Synthetic rubber thin film | Synthetic rubber thin film | Synthetic rubber thin film | Inner liner |
| | Protective layer | Protective material | Material | Non-woven fabric | Film | Non-woven fabric + film | Non-woven fabric | Non-woven fabric | |
| | | | Thickness (mm) | 2.0 | 0.05 | 0.6 | 2.0 | 1.5 | |
| | | | Planar shape | Circular | Hexagonal | Hexaaonal | Elliptic | Circular | |

TABLE 1-continued

| Tire structure | Example 1 FIG. 1 | Example 2 FIG. 1 | Example 3 FIG. 1 | Example 4 FIG. 1 | Example 5 FIG. 1 | Comparative Example FIG. 1 |
|---|---|---|---|---|---|---|
| Elastic material | — | Nylon knitted fabric | Nylon/polyurethane knitted fabric | Nylon/polyurethane woven fabric | Nylon knitted fabric | |
| Thickness T (mm) | 0.3 | 0.7 | 1.1 | 0.5 | 1.2 | 1.0 |
| 100% modulus M (Mpa) | 2.0 | 1.1 | 1.0 | 3.3 | 0.5 | 2.0 |
| Initial rigidity Y at the time of nail insertion (N/mm) | 2.2 | 6.6 | 6.3 | 16.9 | 16.7 | 2.6 |
| Penetration strength S (N) | 81 | 190 | 125 | 222 | 120 | 35 |
| Nail insertion quantity L at the time of penetration (mm) | 80 | 50 | 85 | 35 | 70 | 10 |
| 100 * M * T + 4.5 | 64.5 | 79.5 | 116.5 | 169.5 | 62.5 | 204.5 |
| Y/(M * T) | 3.7 | 8.8 | 5.6 | 10.2 | 28.5 | 1.3 |
| Puncture resistance | Good | Good | Good | Good | Good | Poor |

As can be understood from Table 1, the tire according to each Example has excellent puncture resistance as compared with Comparative Example.

REFERENCE SIGNS LIST 1 pneumatic tire
2 bead portion
2a bead core
3 carcass
4 belt
5 tread
6 inner surface
7 puncture prevention member
7a first protective layer
7b second protective layer
7c third protective layer
8 internal pressure retention layer
9 protective material
11 nail
12 sidewall portion
TE tread edge

The invention claimed is:

1. A pneumatic tire comprising
a puncture prevention member adhered to at least a part of an inner surface of a tire body,
wherein the puncture prevention member includes one or more protective layers each of which includes: an internal pressure retention layer; and a protective material located on a tire outer surface side of the internal pressure retention layer in at least a part of an extending region of the internal pressure retention layer;
wherein the one or more protective layers each further include at least one selected from the group of a woven fabric and a knitted fabric on a region, the region is located in the tire outer surface side of the internal pressure retention layer and in a tire inner side of the protective material; and
wherein the internal pressure retention layer is made of a material selected from natural rubber, synthetic rubbers, and thermoplastic elastomers;
wherein the puncture prevention member includes a laminated plurality of protective layers as the one or more protective layers, and a plurality of protective materials circular in planar view are arranged in each of the plurality of protective layers, and
the plurality of protective materials in each of the plurality of protective layers are arranged out of phase with the plurality of protective materials in each of other protective layers of the plurality of protective layers so that at least one protective material is present when the puncture prevention member is viewed in a lamination direction of the plurality of protective layers.

2. A pneumatic tire comprising
a puncture prevention member adhered to at least a part of an inner surface of a tire body,
wherein the puncture prevention member includes one or more protective layers each of which includes: an internal pressure retention layer; and a protective material located on a tire outer surface side of the internal pressure retention layer in at least a part of an extending region of the internal pressure retention layer;
wherein the one or more protective layers each further include at least one selected from the group of a woven fabric and a knitted fabric on a region, the region is located in the tire outer surface side of the internal pressure retention layer and in a tire inner side of the protective material; and
wherein the puncture prevention member includes a laminated plurality of protective layers as the one or more protective layers, and a plurality of protective materials circular in planar view are arranged in each of the plurality of protective layers, and
the plurality of protective materials in each of the plurality of protective layers are arranged out of phase with the plurality of protective materials in each of other protective layers of the plurality of protective layers so that at least one protective material is present when the puncture prevention member is viewed in a lamination direction of the plurality of protective layers.

* * * * *